(12) United States Patent
Trapasso

(10) Patent No.: US 6,487,458 B1
(45) Date of Patent: Nov. 26, 2002

(54) ADAPTIVE CLOSED-LOOP SERVO CONTROL

(75) Inventor: David James Trapasso, Bloomfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/387,336

(22) Filed: Aug. 31, 1999

(51) Int. Cl.[7] ............................................... G05B 13/02
(52) U.S. Cl. ............................ 700/28; 700/29; 700/30; 700/31; 700/37; 700/45; 700/71; 318/500; 318/561; 318/568.18; 318/568.22; 318/608; 318/636
(58) Field of Search ............................. 700/28, 29, 30, 700/31, 37–47, 70–71, 73–78; 318/560, 561, 568.18, 568.19, 568.22, 608, 610, 615–620, 636

(56) References Cited

U.S. PATENT DOCUMENTS

| | | | |
|---|---|---|---|
| 3,693,939 A | | 9/1972 | Buckson ..................... 254/172 |
| 4,999,557 A | | 3/1991 | Inoue .......................... 318/609 |
| 5,420,490 A | | 5/1995 | Jeon ............................ 318/632 |
| 5,475,291 A | | 12/1995 | Yoshida et al. ........ 318/568.22 |
| 5,825,582 A | * | 10/1998 | Supino et al. .......... 318/568.18 |
| 5,880,953 A | * | 3/1999 | Takeuchi et al. .......... 360/77.01 |
| 6,232,737 B1 | * | 5/2001 | Kachi et al. ................. 318/271 |
| 6,263,251 B1 | * | 7/2001 | Rutschmann ............. 369/44.36 |
| 6,317,637 B1 | * | 11/2001 | Limroth ........................ 700/37 |
| 6,330,483 B1 | * | 12/2001 | Dailey .......................... 318/561 |

FOREIGN PATENT DOCUMENTS

| | | | | |
|---|---|---|---|---|
| EP | 0762255 A1 | | 3/1997 | |
| EP | WO 01/16656 A1 | * | 8/2000 | ........... G05B/11/42 |

* cited by examiner

Primary Examiner—Ramesh Patel
(74) Attorney, Agent, or Firm—Patrick M. Griffin

(57) ABSTRACT

A closed-loop control of a servo motor in which multiple closed-loop terms of a motor command are adaptively tuned and selectively activated to achieve both stable operation and improved performance. The motor command includes a first term proportional to an error signal, a second term based on the integral of the error signal, and a third term based on the rate of change of the measured feedback signal, and representing the kinetic energy of the system. The first term is continuously active, whereas the second term is only activated when the rate of change of the measured feedback signal is below a threshold, and the third term is only activated when the error signal is within a reference window, thereby allowing relatively high gains while ensuring stable operation. In applications involving an oscillatory load, changes in system response are detected based on variation in the rate of change of the measured feedback signal for purposes of adaptively adjusting the predefined gains and references, thereby eliminating the need to measure various ambient, system or load parameters that affect system performance and stability. Various other features of the control include a technique for reducing stress and energy consumption during anticipated stalling, processing techniques for sampling the feedback signal and identifying background noise, and biasing the system to zero error during static operation.

12 Claims, 3 Drawing Sheets

ADAPTIVE CLOSED-LOOP SERVO CONTROL

TECHNICAL FIELD

This invention relates to a closed-loop servo control, and more particularly to a control having closed-loop terms which are adaptively tuned and selectively activated to provide both stable operation and improved performance.

BACKGROUND OF THE INVENTION

Servo controls are employed in a wide variety of applications for maintaining the actual value of a controlled parameter in agreement with a desired or commanded value. In many applications, the control may be characterized as closed-loop, in that the actual value of the controlled parameter is measured and compared to the desired value to form an error signal, which in turn, determines the magnitude and direction of effort required to bring the actual value into agreement with the desired value. For example, in an application in which the position of a motor-driven actuator is to be controlled, the actual position of the motor or actuator is typically measured to form a position error signal, which in turn, is used to control the motor direction and torque, with the objective of driving the error signal substantially to zero. Such a control is generally referred to as a proportional control since the control effort is determined in proportion to the measured error. Stability and performance can be enhanced by additionally adjusting the effort in relation to the integral of the error (so-called integral control) and/or the derivative of the error (so-called derivative control). In general, integral control is used to eliminate small errors that persist over a period of time, while derivative control is used to increase the effort in response to sudden increases in the error signal.

While the above-described control techniques can be used to achieve reasonably fast and stable servo performance, calibrating the closed-loop gains can be a very difficult and time consuming process, particularly in applications involving a wide range of operating conditions and non-linear loading. In an automotive environment, for example, the control has to be designed to achieve reasonably fast and stable performance over wide ranges of ambient temperature and operating voltage. One approach is to tune the control gains to ensure stable operation in a worst-case condition, such as high temperature/high voltage. However, this approach is a compromise by definition, and results in poor overall performance. Another approach is to adjust the control gains on-the-fly by table look-up based on various system measurements. However, this approach requires increased system expense and a considerable calibration effort that has to be repeated if the system design changes. Even under the most favorable conditions, the performance of the control is typically compromised to ensure stability.

Accordingly, what is needed is a closed-loop servo control that provides both stable operation and improved performance, with minimal system expense and calibration effort.

SUMMARY OF THE INVENTION

The present invention is directed to an improved closed-loop control of a servo motor in which multiple closed-loop terms are adaptively tuned and selectively activated to achieve both stable operation and improved performance, as compared to conventional closed-loop controls. According to the invention, the motor command includes a first term proportional to an error signal, a second term based on the integral of the error signal, and a third term based on the rate of change of the measured feedback signal, and representing the kinetic energy of the controlled parameter. The first term is continuously active, whereas the second term is only activated when the rate of change of the measured feedback signal is below a reference rate of change, and the third term is only activated when the error signal is within a reference window, thereby allowing relatively high gains while ensuring stable operation. In applications involving an oscillatory load, changes in system response are detected based on variation in the rate of change of the measured feedback signal for purposes of adaptively adjusting the predefined gains and references, thereby eliminating the need to measure the various ambient, system or load parameters that affect system performance and stability. Various other features of the control include a technique for reducing stress and energy consumption during anticipated stalling, processing techniques for sampling the feedback variable and identifying background noise, and biasing the system toward zero error during static operation.

DESCRIPTION OF THE PREFERRED EMBODIMENT

Figure 1:
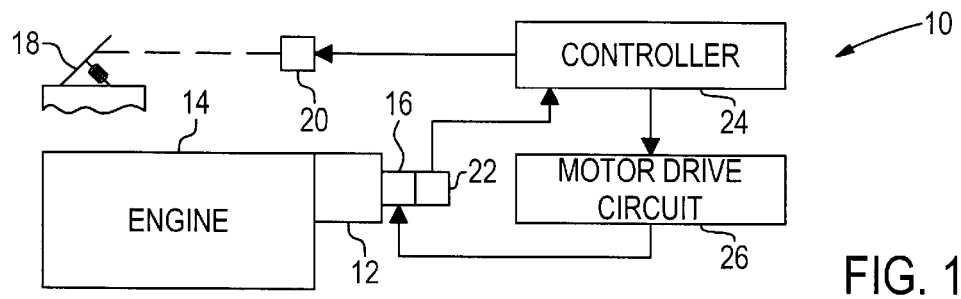
FIG. 1 is a system diagram for the control of engine valve operation with a servo motor based on a position command signal, including a microprocessor-based controller.

Referring to the drawings, and particularly to FIG. 1, the reference numeral 10 generally designates a closed-loop servo control system according to this invention, as applied to a valve actuator 12 of a vehicular internal combustion engine 14. The valve actuator 12 is an electromechanical device that controls the timing of the engine intake valves, and hence the engine air intake, based on the position of an electric motor 16. A position command for the motor 16 is developed based on the position of a driver manipulated accelerator pedal 18, and the servo control system 10 drives the motor 16 accordingly. As illustrated in FIG. 1, the servo control system 10 includes a sensor 20 for sensing the position of accelerator pedal 18 and developing a corresponding position command, a sensor 22 for developing a position feedback signal corresponding to the actual position of the drive motor 16, a microprocessor-based controller 24, and a motor drive circuit 26. The position command and position feedback signals developed by the sensors 20, 22 are provided as inputs to the controller 24, which carries out a closed-loop servo control algorithm to develop a motor command signal, which is applied to the motor drive circuit 26, which in turn, is coupled to motor 16. In the illustrated embodiment, motor 16 is a DC servo motor, the drive circuit 26 is a conventional bridge circuit, and the motor command signal developed by controller 24 determines the magnitude and direction of current supplied to motor 16 by drive circuit 26.

In general, the servo control 10 may be described as a closed-loop position control in which the position command and feedback signals are compared to develop an error signal (ES) that is used in part to develop the motor command signal. According to the invention, the motor command (MC) signal includes first, second and third terms. The first term, referred to herein as the proportional term, is based on the product of a first gain term (K1) and the error signal ES. The second term, referred to herein as the integral term, is based on the product of a second gain term (K2) and a summation of several consecutively determined values of the error signal ES. The third term, referred to herein as the deceleration term, is based on the product of a third gain term (K3) and the square of the rate of change of the position feedback signal (that is, the square of the motor velocity VEL). This can be expressed algebraically as:

$$MC=(K1*ES)+(K2*\Sigma ES)-(K3*VEL^2)$$

If desired, an additional fixed term, referred to herein as the START term, may be added to the motor command MC to help overcome the static friction of the system, and thereby initiate motor movement from rest.

According to an important aspect of this invention, the integral and derivative terms are selectively activated to increase the servo performance. The deceleration term is used to decelerate the motor 16, and is only activated when the error signal ES is within a reference error window WINerr. The integral term is used for fine error correction, and is only activated when the velocity VEL is below a reference velocity VREFint.

According to another important aspect of this invention, the servo parameters (gains and references) are dynamically adjusted for changes in system response based on a comparison of the average motor velocity VELavg with a reference average velocity VELref established for a given movement of the actuator 12. If the comparison indicates an increase in the system response, for example, K1, K2 and VREFint are decreased, while K3 and WINerr are increased. This compensates the control for numerous variations, such as system voltage, ambient temperature, changes in load, etc.

Preferably, the motor command MC is influenced by additional parameters to even further enhance the servo control performance. One such parameter is a braking bias term (BIAS) that opposes position error signal ES and is activated when the error signal ES is within a dead-band DB if the system is such that no effort is required to maintain a given position. Another parameter is a stall relief term that operates in response to a detected pattern of motor stalling to disable the motor 16 at the onset of an anticipated stall interval and re-enable motor 16 just prior to the end of the interval.

Figure 2:
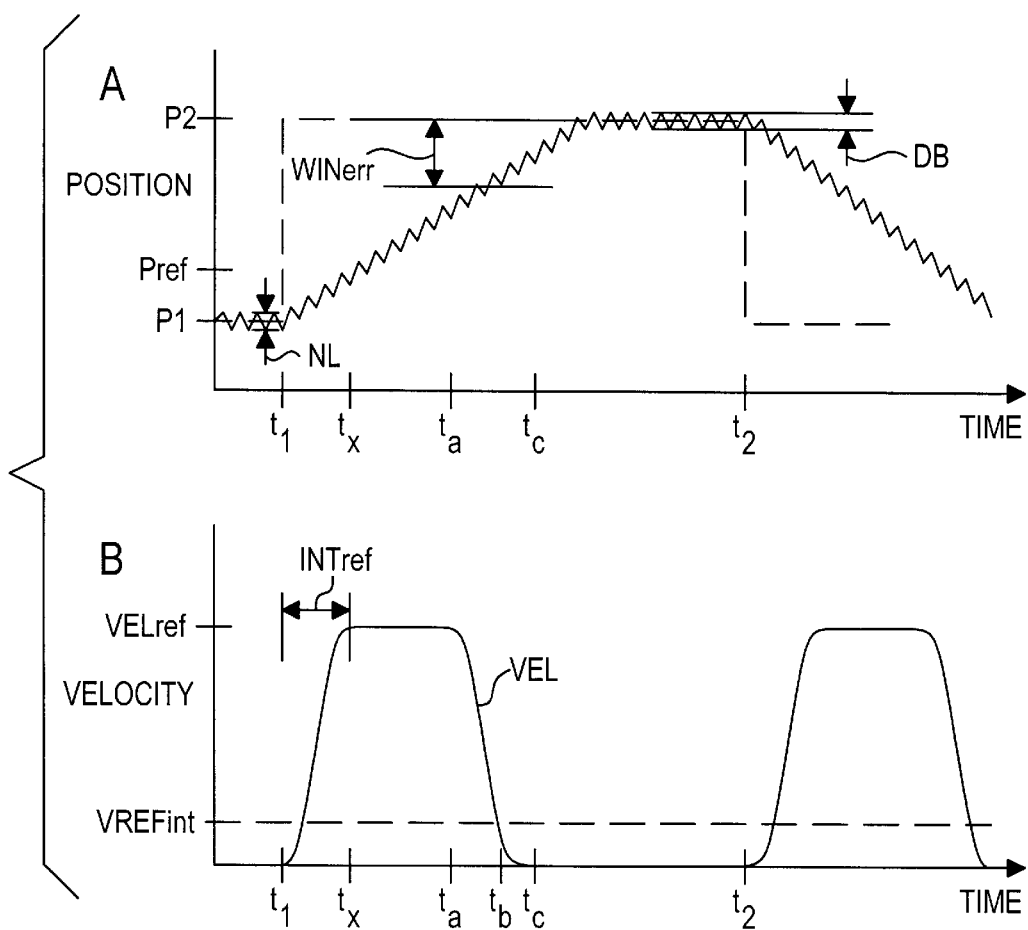
FIG. 2, Graphs A-B, depict the desired and actual positions of the servo motor of FIG. 1, and its velocity, all as a function of time.

The above-described aspects of the invention are illustrated in FIG. 2 by the Graphs A and B, which respectively depict the measured motor position and velocity as a function of time in response to a step change in the desired position. The desired position is represented by the broken trace in Graph A; at time $t_1$, there is a step change from position P1 to position P2, and at time $t_2$, there is a step change from position P2 to position P1. The measured motor position is given by the solid trace in Graph A, and the jitter represents the noise level (NL) of the signal. Prior to time $t_1$, the servo control system 10 maintains the servo motor 16 at position value P1. In systems where no active control of the servo motor 16 is required to maintain a static position, the braking bias term BIAS prevents the motor position from drifting outside of a small dead-band DB about the desired position. Shortly after time $t_1$, the error between the desired and measured motor positions develops a large proportional term, which drives the motor position toward the desired value, as indicated by the motor position and velocity traces. As the motor position nears the desired value, the error falls within an error window WfNerr illustrated in Graph A at time $t_a$. At such point, a deceleration term representing the kinetic energy of the system (K3*VEL$^2$) is activated for quickly decelerating the motor 16 to prevent overshoot, as best seen in the velocity trace of Graph B. When the velocity falls below VREFint at time $t_b$, an integral term representing the cumulative position error beginning at time $t_b$ is activated to correct for low level position error. At time $t_c$, the error falls within the dead band DB, as reflected in the position and velocity traces, and the braking term BIAS is re-instated to maintain the motor position at the desired value. An analogous situation occurs, beginning at time $t_2$ when the desired position value drops to position P2.

Dynamic adjustment of the gains K1, K2, K3 and the references VREFint and WINerr is achieved by measuring the average motor velocity over a reference interval INTref and comparing it to the reference average velocity VELref. In Graph B, the reference interval INTref is designated as a full output interval beginning at time $t_1$ when the motor 16 is at rest, and ending at time $t_x$ when the actual position reaches a reference position Pref. The reference position Pref may be predefined, or determined as a given fraction of the change in position requested at time $t_1$. Ordinarily, the reference average velocity VELref is calibrated in advance as the highest average velocity over the interval INTref for which stable control is achieved, but this may be alternatively be performed by the controller 24 when the system is first initialized. If the system conditions change to the point where the average velocity exceeds the reference average velocity, system stability is preserved by decreasing the proportional and integral gains K1, K2 and the threshold VkBFint, while increasing the deceleration gain K3 and the window WlNerr. On the other hand, if the average velocity falls below the reference average velocity, the system performance is maintained by increasing the proportional and integral gains K1, K2 and the threshold VREFint, while decreasing the deceleration gain K3 and the window WINerr.

Figure 3A:
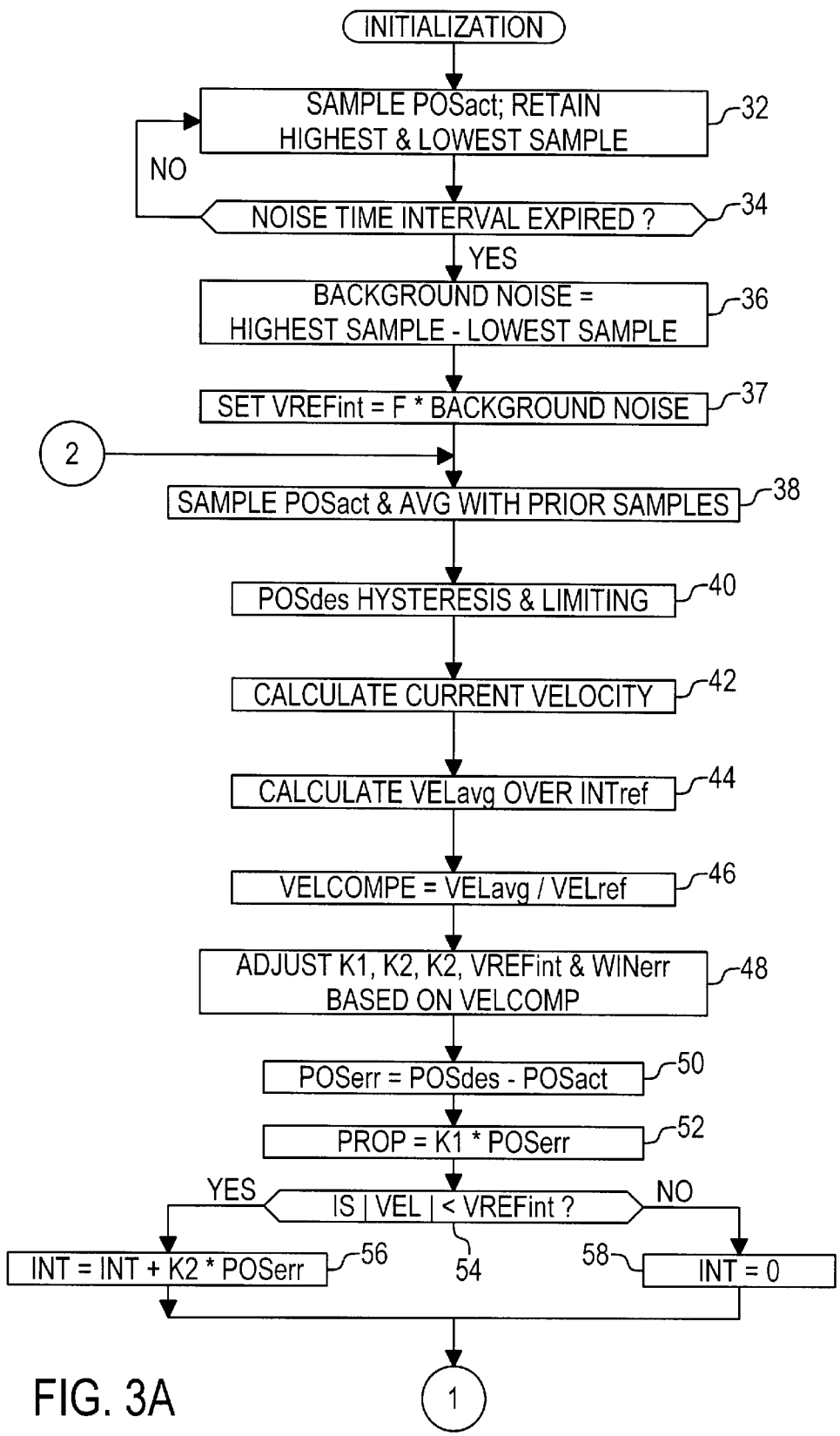
FIGS. 3A–3B depict a flow diagram representative of computer program instructions executed by the controller of FIG. 1 in carrying out the control of this invention.
Figure 3B:
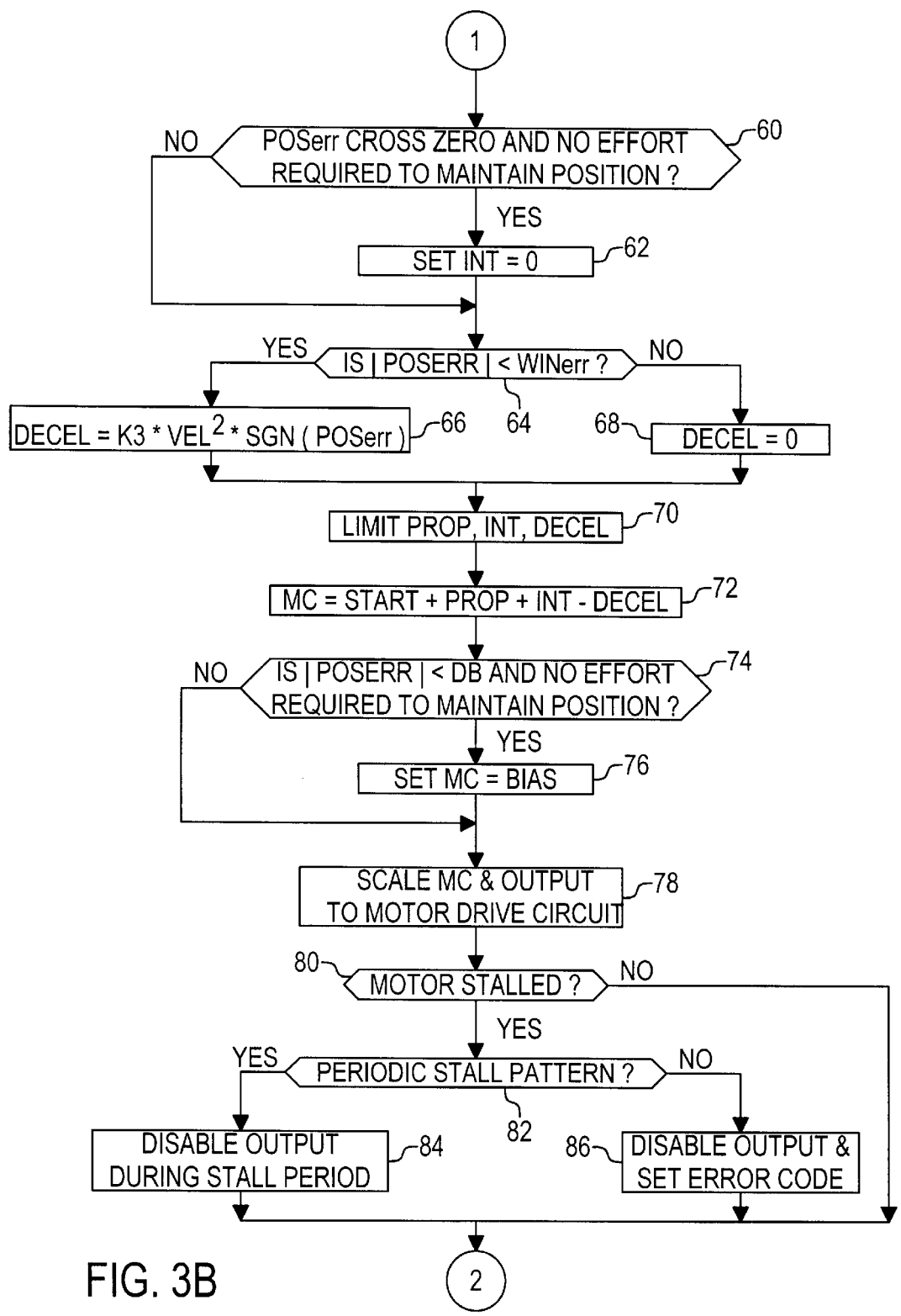

FIGS. 3A–3B depict a flow diagram representative of computer program instructions executed by the controller 24 for carrying out the above-described servo control. The circled connector numerals 1 and 2 designate flow diagram lines linking FIGS. 3A and 3B.

Referring to FIG. 3A, the blocks 30–37 designates a series of initialization instructions executed at the initiation of each period of vehicle operation for setting various parameters and gains to an initial or default setting. The blocks 32–37 determine the level of background noise represented by the jitter in Graph A of FIG. 2 for the purpose of selecting a suitable threshold VREFint for activating the integral term INT. Preferably, the threshold VREFint is set to a value several times higher than the determined background noise to ensure that the integral term is not activated by a noise-related velocity indication. The background noise is determined by blocks 32–36, which serve to repeatedly sample the position sensor output POSact over a specified Noise Time Interval. The highest and lowest samples over the interval are retained and differenced to determine the background noise level. As indicated at block 37, the threshold VREFint is then set according to the product of the background noise and a factor F, the factor F preferably having a value in the range of 3.0–4.0.

Following initialization, the block 38 is executed to sample a current value of POSact and average it with several previously sampled values of POSact to form a substantially noise-insensitive indication of actual motor position. This can be conveniently accomplished with a multiple-place buffer that maintains the last N samples of POSact, with the average being computed according to the sum of the samples divided by N. An aspect of this invention that streamlines this process involves signaling an A/D input port of the controller 24 to sample POSact and initiate the A/D conversion process, and meanwhile sum the contents of the buffer. After the summing operation is completed, the new POSact sample is summed with the prior samples and subjected to the divide operation to form the average. This process has proved to be an efficient one, since necessary computational steps are performed in parallel with the A/D conversion process.

The block 40 is then executed to subject the desired position signal to hysteresis and limiting functions. The hysteresis function operates to restrict updating of the desired position POSdes to signal changes in excess of a hysteresis threshold, and the limiting function establishes upper and lower limits for POSdes.

The blocks 42 and 44 then calculates the current motor velocity VEL and the average velocity VELavg over the interval INTref. The current velocity VEL is based on the change in POSact since the previous loop, whereas determination of VELavg involves identifying an interval INTref of full output beginning with an "at rest" condition and ending with POSact≧Pref, as described above in reference to FIG. 2. This can be conveniently achieved with a multiple-place buffer, similar to the process described above in reference to block 38, except that the number of samples in this case varies depending on the system response time.

Blocks 46 and 48 then dynamically adjust the gain terms K1, K2, K3 and the thresholds WINerr and VREFint based on the magnitude of VELavg relative to a reference average velocity VELref. The block 46 computes a velocity compensation term VELCOMP as the ratio VELavg/VELref, and the block 48 uses the value of VELCOMP as an adjustment factor for the gain terms and thresholds, as described above in reference to FIG. 2. Alternatively, of course, the difference (VELavg−VELref) could be used to adjust the gain terms and thresholds.

The blocks 50 and 52 are then executed to compute the position error POSerr according to the difference (POSdes−POSact), and to compute the proportional term PROP according to the product (K1*POSerr). The sign of POSerr may also be noted at this point in case the gain terms and/or other servo parameters differ depending on the direction of motor effort. If the absolute value of the motor velocity (|VEL|) is less than the threshold VREFint, as determined at block 54, the integral term INT is updated based on the position error POSerr determined at block 50. If |VEL|≧VREFint, the integral term INT is reset to zero, as indicated at block 58.

Referring to FIG. 3B, the block 60 is then executed to determine if the error signal POSerr has reached or crossed zero (that is, POSact≈POSdes) and no effort is required to maintain the motor position. If both conditions are true, the block 62 resets the integral term INT to zero. In the illustrated embodiment, however, effort is required to maintain a given motor position, and the integral term TNT is retained.

The blocks 64–68 then determine the deceleration term DECEL. If the absolute value of the position error POSerr is within the window WINerr, as determined at block 64, the block 66 is executed to compute DECEL according to the product [K3*VEL$^2$*Sgn(POSerr)], where Sgn(POSerr) has a value of±one, depending on the sign of POSerr. If block 64 is answered in the negative, the block 68 is executed to set DECEL to zero, deactivating the deceleration term.

The blocks 70–72 are then executed to individually limit the proportional, integral and deceleration terms to respective maximum values, positive or negative, and to compute the motor command MC according to the sum (START+PROP+INT−DECEL). The term START is a fixed quantity having a sign that opposes the position error POSerr; it helps overcome static friction in the system at the initiation of motor rotation. If the system is such that no effort is required to maintain a static motor position, the blocks 74–76 operate to reduce the motor command MC to a fixed magnitude braking bias term BIAS that opposes POSerr when the absolute value of POSerr is within a dead-band DB. Unlike the START term which is sized to initiate motor rotation, the BIAS term is sized only to prevent drifting from a given motor position. If effort is required to maintain a given motor position, MC remains as computed at block 72. At block 78, the motor command MC is scaled and outputted to the motor drive circuit 26.

Finally, the blocks 80–86 are executed to determine if the motor is stalled, and if so, what action to take. Motor stalling may be detected in a number of ways; for example, when MC is greater than a threshold, and the velocity VEL remains at zero for at least a given time. If the motor is stalled, as determined at block 80, and the system has a periodic stall pattern, as determined at block 82, the block 84 is executed to identify the stall pattern and disable the servo motor 16 during the anticipated stall period. For example, the system may be designed so that the motor 16 periodically operates in a stall condition for certain period of time. In such case, the controller 24 disables the output (MC=0) at the onset of the stall period, and then re-enables the output just prior to the end of the stall period. This saves energy and reduces stress on the system hardware without decreasing the system response. If block 82 is answered in the negative, the stall condition represents an abnormal situation, and the block 86 sets an error code or otherwise alerts the driver of the problem. As indicated by the circled numeral 2, the controller 24 then returns to block 38 of FIG. 3A to obtain the next value of POSact, and so on.

In summary, this invention provides an adaptive closed-loop servo control that compensates for system and ambient variations without requiring extensive calibration effort. While described in the context of an automotive valve position control, it equally applies to other closed-loop control systems where the desired value of a controlled parameter is given as an input, and the actual value of the parameter is measured to form a feedback variable. In this regard, for example, references to motor velocity in the context of the illustrated embodiment may be more generally characterized as the rate of change of the measured parameter, and so on. Thus, it will be understood that this invention is not limited to the illustrated embodiment, but rather is defined by the appended claims.

What is claimed is:

1. A closed-loop servo control system in which an actuator is energized in accordance with an actuator command to bring a specified parameter of a controlled device into correspondence with a desired value, and the actuator command is determined as a function of an error signal computed according to a difference between the desired value and a measured value of the specified parameter, characterized in that:

the actuator command includes a proportional term proportional to the error signal, a integral term proportional to an integral of the error signal, and a deceleration term based on the error signal and proportional to the kinetic energy of the actuator and controlled device;

the integral term is only activated when a rate of change of the measured value is below a reference rate of change; and the deceleration term is only activated when the error signal is within a reference error window.

2. The closed-loop servo control system of claim 1, wherein the deceleration term is determined according to the square of the rate of change of the measured value.

3. The closed-loop servo control system of claim 1, wherein the actuator command is determined in accordance with a braking bias term when the error signal is within a dead band, said braking bias term having a fixed magnitude and a direction that opposes the error signal.

4. The closed-loop servo control system of claim 1, wherein the desired value of the specified parameter is periodically varied over a predetermined range, and wherein:

an average rate of change of the measured value over a portion of the predetermined range is determined and compared to a reference value corresponding to an average rate of change which occurs when the control achieves a desired performance characteristic; and the reference rate of change and the reference error window are adjusted based on the comparison between the determined average rate of change and the reference value, in a direction to maintain said desired performance characteristic.

5. The closed-loop servo control system of claim 4, wherein:

the reference rate of change is decreased and the reference error window is increased when the determined average rate of change is greater than the reference value; and the reference rate of change is increased and the reference error window is decreased when the determined average rate of change is less than the reference value.

6. The closed-loop servo control system of claim 4, wherein:

the proportional, integral and deceleration terms include gain factors; and the gain factors are adjusted based on the comparison between the determined average rate of change and the reference value, in a direction to maintain said desired performance characteristic.

7. The closed-loop servo control system of claim 6 wherein:

the gain factors for the proportional and integral terms are decreased and the gain factor for the deceleration term is increased when the determined average rate of change is greater than the reference value; and the gain factors for the proportional and integral terms are increased and the gain factor for the deceleration term is decreased when the determined average rate of change is less than the reference value.

8. The closed-loop servo control system of claim 4, wherein the portion of the predetermined range is defined as a period of operation beginning with a rest condition of the actuator and ending when the measured value achieves a reference value which is a given fraction of the predetermined range.

9. The closed-loop servo control system of claim 1, wherein the control is designed so that the actuator stalls in a periodic pattern, and wherein:

the periodic pattern of actuator stalling is identified;

a period of stalling is predicted based on the identified pattern of stalling; and the actuator is disabled during at least a portion of the predicted period of stalling.

10. The closed-loop servo control system of claim 9, wherein the actuator is disabled at an onset of the predicted period of stalling, and re-enabled prior to termination of said predicted period of stalling.

11. The closed-loop servo control system of claim 1, wherein the measured value of the specified parameter is obtained by repeatedly sampling a current value of the specified parameter, converting each such sample to a digital sample, and then averaging such digital sample with other digital samples, and wherein the averaging is carried out by:

sampling the current value of the specified parameter, and initiating its conversion to a digital sample;

determining an average of the other digital samples during such conversion; and adjusting the determined average for the converted digital sample.

12. The closed-loop servo control system of claim 1, wherein:

variation in the measured value when the actuator is at rest is determined as an indication of background noise level, and the reference rate of change is initialized based on the determined background noise level.

* * * * *